(12) United States Patent
Syska et al.

(10) Patent No.: US 6,446,900 B1
(45) Date of Patent: Sep. 10, 2002

(54) MUD FLAP RETRACTION DEVICE

(76) Inventors: Todd Jeffrey Syska, 106 Spruce La., Clinton Corners, NY (US) 12514; Mark Stephen Syska, P.O. Box 563, Tualatin, OR (US) 97062

( * ) Notice: Subject to any disclaimer, the term of this patent is extended or adjusted under 35 U.S.C. 154(b) by 0 days.

(21) Appl. No.: 09/802,053

(22) Filed: Mar. 9, 2001

(51) Int. Cl.[7] ................................................ B65H 75/28
(52) U.S. Cl. ..................... 242/403; 242/398; 242/403.1
(58) Field of Search .............................. 242/403, 403.1, 242/298

(56) References Cited

U.S. PATENT DOCUMENTS 3,406,921 A * 10/1968 Boston et al. ........... 242/535.1
5,582,431 A * 12/1996 Anderson .................... 280/851
6,158,775 A * 12/2000 Nickels ....................... 280/154

FOREIGN PATENT DOCUMENTS

AU   8423632 A1 *  7/1984
FR   2798110 A1 *  6/2001

* cited by examiner

Primary Examiner—Donald P. Walsh
Assistant Examiner—Jonathan R. Miller

(57) ABSTRACT

A retractable mud flap assembly for a motor vehicle consisting of two side plates connected by rods upon which are fitted rollers such that the assembly forms a cage in which the mud flap is rolled when in the retracted position and the machinery necessary to direct a motive force to cause the retraction and extension of said mud flap.

1 Claim, 3 Drawing Sheets

MUD FLAP RETRACTION DEVICE

BACKGROUND—Field of Invention

Figure 1:
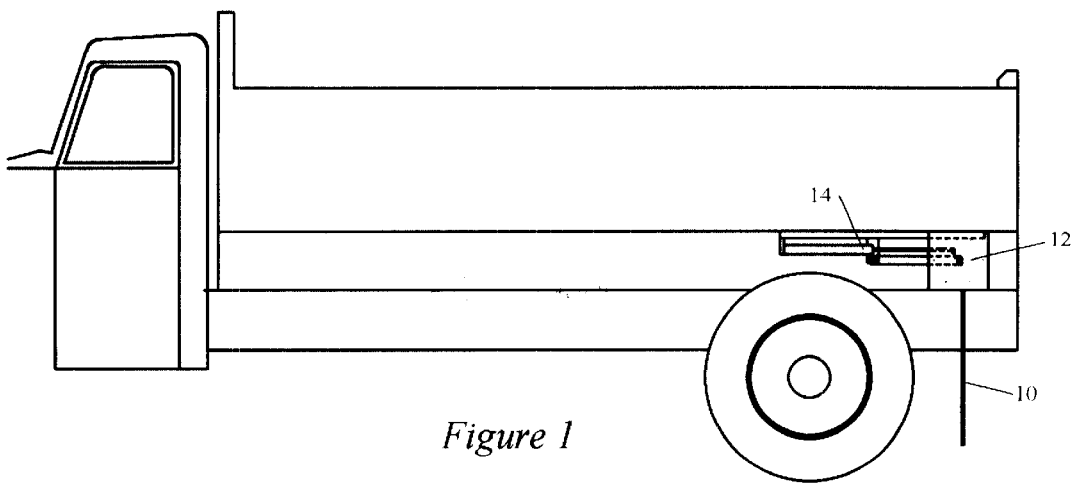

The present invention relates to mud flaps for trucks and more particularly to a retractable mud flap assembly for the purpose of relocating the mud flap, from its operational position behind the rear wheels, to an alternate position less susceptible to damage caused by, the mud flap being caught beneath the wheels when the truck is backed over rough terrain, or the mud flap being pinched between the wheels and a dumped load or other piece of equipment.

BACKGROUND—Description of Prior Art

The laws of many states as well as federal law requires the mandatory use of mud flaps on trucks while on the highway. Such flaps are necessary to protect other vehicles and persons from mud and materials being thrown to the rear of the vehicle incident to wheel rotation.

Several instances exist which will cause these mud flaps to become damaged or torn completely from the vehicle. These instances include backing the truck over rough terrain such that the mud flap is caught beneath the rear wheels as the wheels sink into soft ground. Another instance is when the mud flaps become buried in the material dumped from a dump truck. As the dump truck is driven away the mud flaps remain and are torn from the vehicle. Another instance is when the truck is mated with some other piece of equipment, such as a paver. When the combined unit is moved, the mud flaps may become entangled between the wheels and the coupled equipment such that the mud flap is torn from the vehicle.

A review of prior art therefore reveals attempts to eliminate this problem and several differing approaches have been proposed. Case, U.S. Pat. No. 2,935,366 and Manning, U.S. Pat. No. 5,044.677 describe mud flap retaining methods whereby the mud flap is easily removed and replaced to prevent damage or to facilitate the replacement of a mud flap when necessary due to damage or loss.

Barrett, U.S. Pat. No. 2,872,211 describes a method whereby the mud flap is pivoted from it's operative position, transverse to the longitudinal axis of the truck behind the rear wheels, to a position parallel the longitudinal axes of said truck and alongside the rear wheels, at the outer edge of the truck. Due to the outward pivoting of the mud flap, during operation, this mechanical device requires additional clearance around the portion of the truck where the mud flap relocation is occurring. In tight quarters it may not be possible to properly relocate the mud flap and extreme care must be taken to insure that persons in the immediate vicinity of the truck not be struck and injured by the operation of said device.

Fusco, U.S. Pat. No. 4,033,599 and Knowley, U.S. Pat. No. 4,541,646 also describe pivoting mud flap mounting devices however these two devices pivot the mud flap inward, stowing the mud flap parallel to the rear of said truck in the area between the rear wheels where it is less likely to become damaged. Both of these devices require the operator to manually relocate the mud flap to the desired position. While in the stowed position these devices do offer some protection from damage caused by the truck's wheel during a backing operation, these devices do not offer protection from damage caused by materials being dumped from the truck or damage caused by other equipment that may be coupled to the rear of the truck.

Various flap retraction systems have been proposed. The aim of these devices is to effectively shorten the mud flap thus eliminating the portion of the mud flap which could become entangled with the wheels, the dumped load, or other equipment coupled to the rear of the truck.

Saxton U.S. Pat. No. 3,165,360; Hartling, U.S. Pat. No. 3,203,710; Moore, U.S. Pat. No. 3,582,109; and Cole U.S. Pat. No. 3,806,196; attempt to achieve this goal by raising the lower portion of the mud flap thereby causing it to fold in half. These design all require the use of cables or other lifting mechanisms attached to the lower portion of the mud flap, where they themselves are subject to damage and entanglement. Additionally, the mounting of these devices is truck specific; that is each type of truck requires a slightly differing design to ensure that the mud flap is raised to the proper position and that the lifting mechanism does not interfere with the operation of the vehicle.

Zerby, U.S. Pat. No. 2,981,553 proposes to use cables and pulleys to pivot the entire mud flap to a horizontal plane by attaching a cable to the bottom of the mud flap through a pulley which is affixed to the truck frame above and behind the aforementioned mud flap. Because the location of the pulley must be some distance to the rear of the mud flap this system can not be installed on trucks that have their rear most wheels located close to the rear of the truck. This system will also suffer from the ills associated with cables attached to the lower portion of the mud flap and pulleys which are subject to damage, misalignment, and have truck specific mounting requirements.

France, U.S. Pat. No. 3,794,383 proposed a retraction device which raises the entire mud flap through use of cables and pulleys, activated by the dumping truck body or other mechanical means. These systems with the array of pulleys and cables require truck specific mounting, and are easily damaged as material snags or entangles the apparatus, and dirt or debris fowls the system.

Overend, U.S. Pat. No. 3,580,604 and Kayazek U.S. Pat. No. 3,806,197 propose that two short mud flaps be employed, one hanging below the other to achieve the desired overall length, and a retraction device designed to lift only the lower mud flap be employed to a raise this lower mud flap to a location where interferences will not occur. These devices use steel supports and springs or cables to hold the lower flap in position and relocate the mud flap to the raised position. These supports are easily damaged by equipment contacting the rear of the truck leaving the device inoperable. Another disadvantage is that this installation is also truck specific, that is each truck will require a different design to properly position the mud flaps.

Anderson, U.S. Pat. No. 5,582,431 proposes a mud flap retraction device consisting of an enclosure located above the rear wheels in which the mud flap is retracted using a hydraulic cylinder. The suspension design of many truck is such that the vertical travel of the rear wheels extends upward into a wheel well designed into the truck body. This device, located directly above the rear wheels limits the effective suspension travel and could be easily damaged by the upward movement of the rear wheels during their normal travel.

OBJECTS AND ADVANTAGES

A principal object of the invention is to provide a retractable mud flap system whereby the mud flaps, operationally disposed behind the vehicle, may be retracted to an alternate, out of the way, position, under operating conditions which might cause those particular mud flaps to be damaged or destroyed.

Another object is to provide a retractable mud flap system that is simple in construction and accordingly economical to build and may be easily installed on all existing trucks or installed as new equipment on yet to be built vehicles.

Another object is to provide a retractable mud flap system that protects the mud flap from damage when retracted while eliminating the need for springs, cables, and pulleys attached to the truck body, or specially constructed mud flaps.

Another object is to provide a retractable mud flap system that is reliable, durable, and trouble free. One that will not become inoperable despite the effects of dirt, grime, and mud under the truck, and will not be subject to damage by debris, contact with moving parts of the vehicle, or contact with other equipment associated with the use of the truck.

Another object is to provide a retractable mud flap system that can be operated automatically or manually from the drivers compartment for the truck.

Further objects and advantages will be apparent, to those skilled in the art, from the following detailed descriptions, claims, and accompanying drawings which illustrate a preferred embodiment of the invention.

LIST OF FIGURES

FIG. 1 View showing flap retraction device mounted on left side of truck

Figure 2:
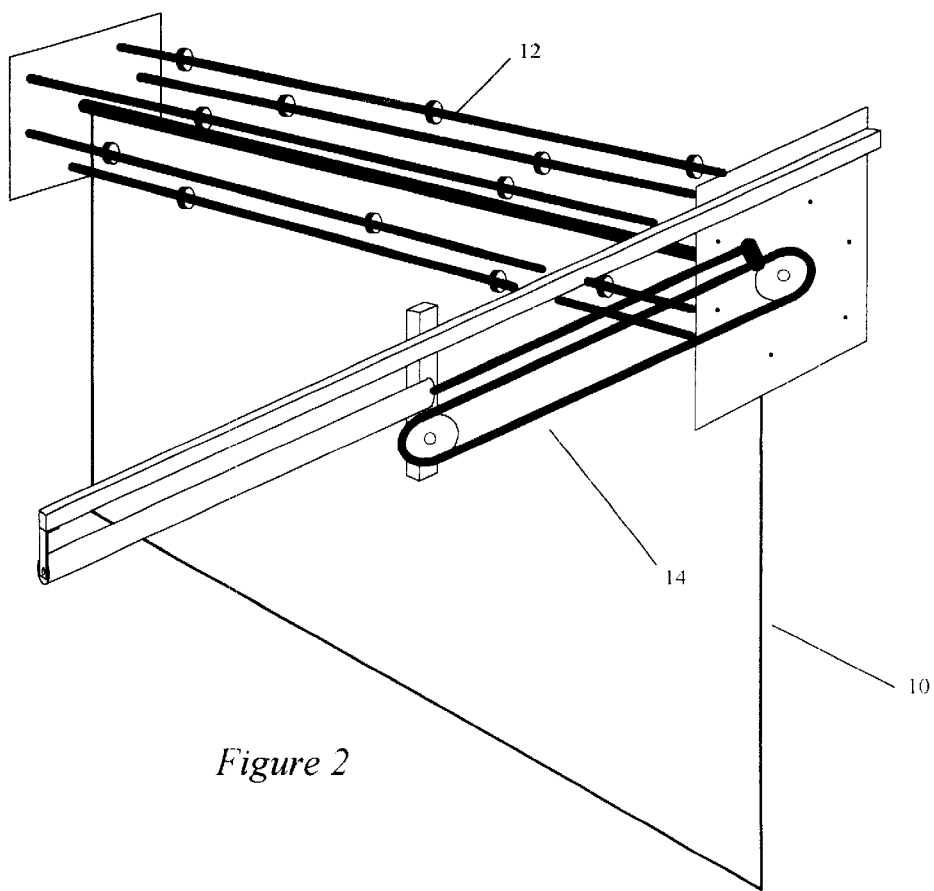

FIG. 2 Overall view, of a right side unit, showing main components

Figure 3:
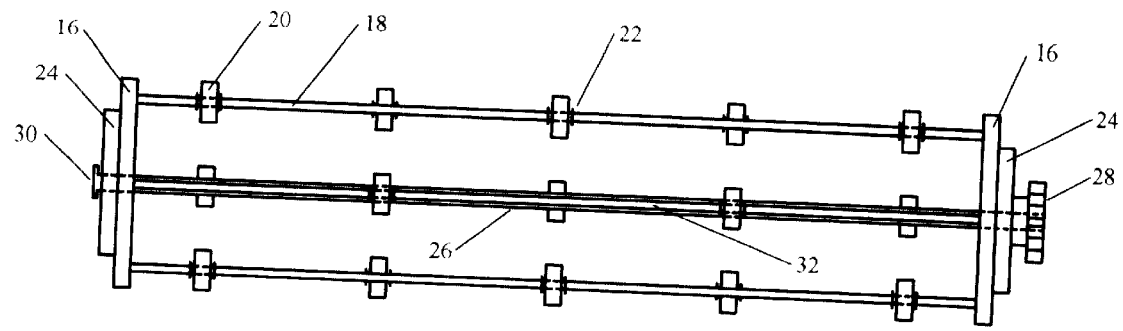

FIG. 3 Frontal view of cage assembly showing main shaft and two of the six roller support bars, with their respective rollers mounted, and the position of the side plates, thrust blocks, and drive sprocket.

Figure 4:
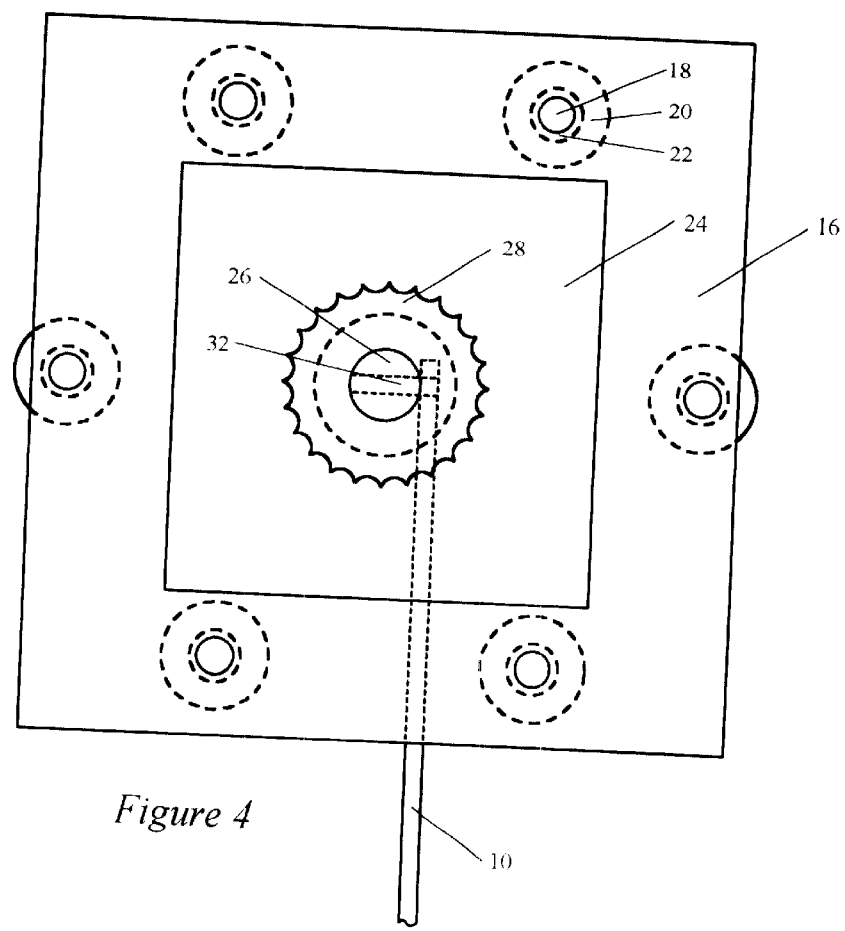
Figure 5:
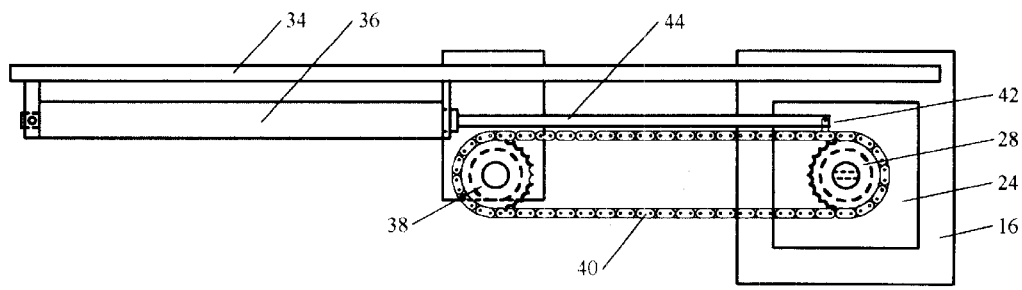

FIG. 4 End plate detail showing location and orientation of the roller support bars FIG. 5 Detail of the retraction mechanism showing the pneumatic cylinder, support arm, mounting plates, drive chain and sprockets.

Figure 6:
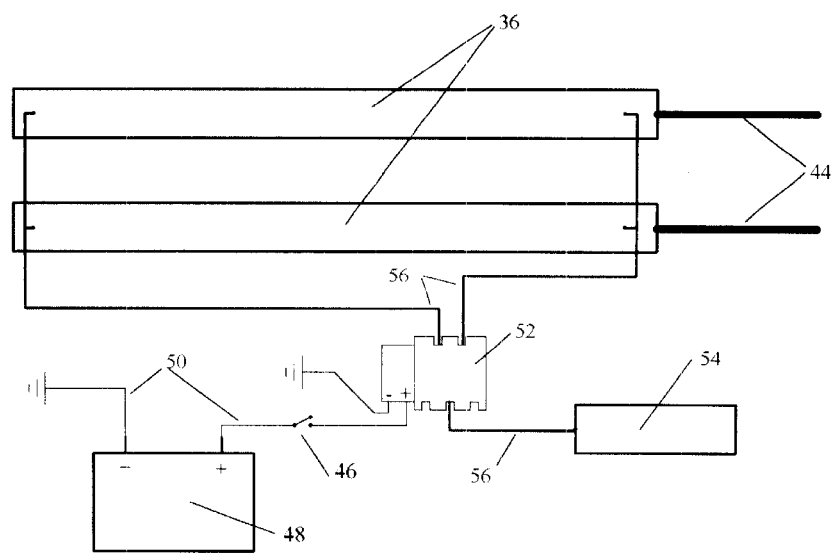

FIG. 6 Schematic showing typical connections to air and electric.

LIST OF REFERENCE NUMERALS

10 Mud Flap
12 Cage Assembly
14 Retraction Mechanism Assembly
16 Side Plate
18 Roller Support Bar
20 Roller
22 Roller Retainer Ring
24 Thrust Block
26 Shaft
28 Drive Sprocket
30 Shaft Retainer
32 Flap Attachment Hole
34 Cylinder Support Arm
36 Cylinder
38 Idler Sprocket
40 Drive Chain
42 Attachment Link
44 Cylinder Rod
46 Activation Switch
48 Battery
50 Wire
52 Five Port Solenoid Air Valve
54 Air Supply Tank
56 Air Line

SUMMARY

This invention is a retractable mud flap assembly for a motor vehicle consisting of two side plates connected by rods upon which are fitted rollers such that the assembly forms a cage in which the flap is rolled when in the retracted position and a mechanism which will cause the mud flap to retract into and extend from the cage assembly.

DESCRIPTION OF THE PREFERRED EMBODIMENT

Turning now to the drawings, the retractable mud flap assemble, of the present invention, as shown, by FIG. 1, is to be mounted on a motor vehicle such that the mud flap 10 is disposed behind the rear wheel of said vehicle while being operated on the highway. This retractable mud flap device, shown in FIG. 2, consists of three main components. The mud flap 10, which is disposed behind the rear wheels of a vehicle, during operation, for the purpose of, controlling debris thrown from the rotating wheels. The cage assembly 12 is used to guide the mud flap's path of travel during the retraction and extension process and to control the rolled dimension of the mud flap when in the retracted position and the retraction mechanism 14 which supplies the motive force for the flap retraction and extension operation.

It is intended that the mud flap retraction device be used in pairs with one unit mounted on each of the vehicle. For this purpose, it is suggested that the two units be manufactured as mirror images of each other and that the retraction mechanism 14 be mounted inboard, parallel to the vehicle frame rails.

Details of the construction of the cage assembly 12 are conveyed by FIG. 3 and FIG. 4. The cage assembly 12 consists of two side plates 16 connected by six roller support bars 18, equally spaced in a circular pattern and welded to side plates 16. For clarity, FIG. 2 shows only two of the roller support bars 18. Rollers 20 and roller retainer rings 22 are placed on the roller support bars 18 prior to welding to said side plates 16.

Rollers 20 are arranged on the roller support bars 18 such that alternating support bars 18 receive two or three rollers 20 respectively. Rollers 20 are constructed in such a manner that they are free to rotate on support bar 18 and are kept in their respective lateral position by the placement of the roller retainer rings 22 which are welded to the roller support bars 18.

Thrust blocks 24, are affixed to the outer surfaces of side plates 16 and serve as carrier bearings for shaft 26. Holes drilled through thrust blocks 24 and side plates 16 allow shaft 26 to extend through the assembly and freely rotate upon the longitudinal axes. Drive sprocket 28 is affixed to one end of shaft 26 and shaft retainer 30 is welded to the other to prevent excessive lateral movement of shaft 26 while preserving rotational ability.

Mud flap 10 is affixed to shaft 26 by bolting through flap attachment holes 32 provided for this purpose.

The mud flap retraction mechanism depicted in FIG. 5 consists of cylinder support arm 34 affixed to side plate 16 so as to position cylinder 36 and idler sprocket 38 in the same plane as drive sprocket 28, drive chain 40 being placed about both. Attachment link 42 is used to secure the end of cylinder rod 44 to drive chain 40 such that retraction of cylinder rod 44 will cause rotation of drive sprocket 28 causing retraction of mud flap 10.

OPERATION OF INVENTION

It is anticipated that pneumatic cylinders will be used in the manufacture of this device. Most trucks for which this device is primarily intended are equipped with air breaks and therefore have a ready supply of compressed air available for use as the motive force necessary to retract and deploy the mud flaps. FIG. 6 is a schematic of the necessary parts and connections for a typical installation. When the operator of the vehicle, equipped with this invention, deems that the mud flaps 10 on the vehicle are in danger of being damaged or destroyed the operator activates switch 46 located in the cab of the truck. Activation of this switch sends electrical power, derived from the truck's battery 48 through wires 50 to the electrically operated, five port, solenoid air valve 52. When said air valve is activated air is caused to flow from the truck's air supply tank 54 through air lines 56 to the appropriate end of the double acting pneumatic cylinder 36. This causes the previously extended cylinder rod 44 to retract pulling on chain 40. Chain 40 being wrapped around drive sprocket 28 and idler sprocket 38. Movement of said chain 40 causes said drive sprocket 28 and attached shaft 26 to rotate. Rotation of shaft 26 causes attached mud flap 10 to become rolled about said shaft 26 reducing the length of the hanging portion of mud flap 10 to a length that will no longer be in danger of damage or destruction. When the operator of the vehicle deems it appropriate to extend mud flap 10 back to it's original length the operator places switch 46 in the alternate position. This diverts the air flow through valve 54 to the reverse end of the double acting cylinders 36 causing the cylinder rod 44 to extend. Extension of said cylinder rod 44 thus causes movement of chain 40, drive sprocket 28, idler sprocket 38 and shaft 26 opposite to that which occurred during the retraction procedure. This reversal of movement causes mud flap 10 to unroll and return to the original length and position thus fully disposed behind the rear wheels of said vehicle.

CONCLUSION, RAMIFICATION, AND SCOPE OF INVENTION

Thus the reader will see that the invention described will economically solve the problems associated with having vehicle mud flaps damaged or destroyed during certain operations.

While my above description contains many specifications, these should not be construed as limitations on the scope of the invention, but rather as an exemplification of one preferred embodiment thereof. Many other variations are possible. For example variations of the number of rollers and or roller support bars are possible, changing the design of the cage assembly while preserving the overall function. A cable or belt could be substituted for the drive chain with only minor modifications. While the motive of force of the preferred embodiment is a pneumatic cylinder a hydraulic cylinder, linear actuator, or screw mechanism could easily be substituted. The rotary motion necessary to roll the mud flap could also be provided by a motor directly coupled to the main shaft and this motor may be powered by any means possible.

What is claimed is:

1. A retractable mud flap assembly, for a motor vehicle, comprising two side plates connected by rods upon which are fitted rollers such that the assembly forms a cage surrounding a shaft, rotatably supported by the side plates, upon which is attached a flexible mud flap wherein there is an extended position such that the mud flap is positioned behind the rear wheels of the motor vehicle and a retracted position such that the mud flap is rolled into the cage assembly and a means for repositioning the mud flap from the extended position to the retracted position and from the retracted position to the extended position.

* * * * *